(12) United States Patent
Hall et al.

(10) Patent No.: US 10,554,768 B2
(45) Date of Patent: Feb. 4, 2020

(54) CONTEXTUAL USER EXPERIENCE (71) Applicant: SAP SE, Walldorf (DE)

(72) Inventors: Christina Hall, Dielheim (DE); Lena Voegele, Markgroeningen (DE); Malin Elisabeth Wittkopf, Heidelberg (DE); Christian Geldmacher, Heidelberg (DE); Klaus Herter, Leimen (DE); Ingo Rues, Walldorf (DE)

(73) Assignee: SAP SE, Walldorf (DE)

( * ) Notice: Subject to any disclaimer, the term of this patent is extended or adjusted under 35 U.S.C. 154(b) by 290 days.

(21) Appl. No.: 15/288,564

(22) Filed: Oct. 7, 2016

(65) Prior Publication Data

US 2017/0201592 A1 Jul. 13, 2017

Related U.S. Application Data (60) Provisional application No. 62/278,167, filed on Jan. 13, 2016.

(51) Int. Cl.
*H04L 12/24* (2006.01)
*H04L 29/08* (2006.01)

(52) U.S. Cl.
CPC ............. *H04L 67/22* (2013.01); *H04L 67/32* (2013.01)

(58) Field of Classification Search
CPC ........ H04L 67/22; H04L 67/306; H04L 67/32
USPC ........................................................ 709/220
See application file for complete search history.

(56) References Cited

U.S. PATENT DOCUMENTS

| | | | |
|---|---|---|---|
| 2006/0004680 A1* | 1/2006 | Robarts | G06F 1/163 706/12 |
| 2008/0091515 A1* | 4/2008 | Thieberger | G06Q 10/04 705/7.11 |
| 2011/0212717 A1* | 9/2011 | Rhoads | G06F 17/30241 455/420 |
| 2013/0185750 A1* | 7/2013 | Ayoub | H04N 21/25841 725/34 |
| 2015/0120617 A1* | 4/2015 | C. | G06N 5/027 706/11 |
| 2015/0125832 A1* | 5/2015 | Tran | G09B 19/0092 434/127 |
| 2016/0027278 A1* | 1/2016 | McIntosh | G08B 21/0423 715/741 |
| 2016/0055420 A1* | 2/2016 | Karanam | G06F 19/00 700/52 |
| 2016/0364002 A1* | 12/2016 | Gates | G06F 3/017 |

* cited by examiner

*Primary Examiner* — Moustafa M Meky
*Assistant Examiner* — Elizabeth Kassa
(74) *Attorney, Agent, or Firm* — Sterne, Kessler, Goldstein & Fox P.L.L.C.

(57) ABSTRACT

The present disclosure is directed to a contextual user experience (UX) that utilizes contextual information such as artifacts including quanta of data accessible to the contextual UX, user input, and information retrieved from other sources to determine relevant correlations of interest to the user, which may then be generated and displayed on a computing device. Also described is a method and system for a contextual UX that may generate related but personalized contextual UXs for participants in a shared interaction according to each user's context.

15 Claims, 8 Drawing Sheets

CONTEXTUAL USER EXPERIENCE

FIELD OF THE INVENTION

This disclosure generally relates to dynamically adapting a user experience according to context, user action, and/or other information.

BACKGROUND

Current user experiences (UXs) are typically static. Regardless of a user's activity, intention, skillset, or situation, the UX does not change through time, based on the user (for example, an inexperienced user is served the same UX as an experienced user), or task to be performed (for example, both simple and complex tasks are accomplished using the same UX). Current UXs do not reflect a user's specific situation.

Furthermore, UXs are "passive," as users have to actively interact with a UX through, for example, opening a particular application or inputting and maintaining data, in order to benefit from it. The current paradigm requires the user to know the correct application to launch for the desired purpose, as well as how to use the application. If the user is uncertain, the user must actively search for the information they need. Current UXs do not understand a user's situation, and therefore cannot leverage data or information for the benefit of the user; the data, metadata, and knowledge contained within current systems is not being utilized to its full potential.

Current UXs are also typically aimed at serving a single user, while a user's workflow is often based on interactions with one or more other users. There is a continuous exchange of information during these interactions, and current UXs are unable to leverage that contextual data for the benefit of each of the user's involved in the interaction according to their specific needs.

SUMMARY

Some embodiments of the present disclosure provide systems, methods and/or computer program products for generating and displaying dynamic user experiences (UXs) on a computing device utilizing contextual information. In some embodiments, the contextual UX analyzes contextual information such as artifacts such as quanta of data accessible to the contextual UX, user input, and information retrieved from other sources to determine relevant correlations of interest to the user, which may then be generated and displayed. The contextual UX may also analyze contextual information about the user, such as their emotional state, as determined by biometric data, or their environment, as determined by appropriate sensors. In this way, the contextual UX progressively learns about the user such as their role, skills, interests, and/or emotions, and generates and displays a contextual UX relevant to the user's interactions with the computing device and/or the user's present situation.

In some embodiments, the contextual UX dynamically updates as additional contextual information is made available and is analyzed. For example, the manner in which the user interacts with the contextual UX may provide additional contextual information that the system may utilize to provide additional relevant correlations. In this manner, the contextual UX is continuously updating its knowledge of the user in order to provide a better experience.

Also provided is a contextual UX that may generate related but personalized contextual UXs for participants in a shared interaction. That is, the contextual UX may understand each participant's role within the context of the shared interaction, and generate and display relevant correlations related to the shared interaction within the context of the user's specific situation.

Embodiments of the present disclosure will be described in detail in the exemplary embodiments presented in the drawings and disclosure set forth below.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Exemplary embodiments of the present disclosure provide for a method, device, system, and computer program product for providing a contextual user experience.

Figure 1A:
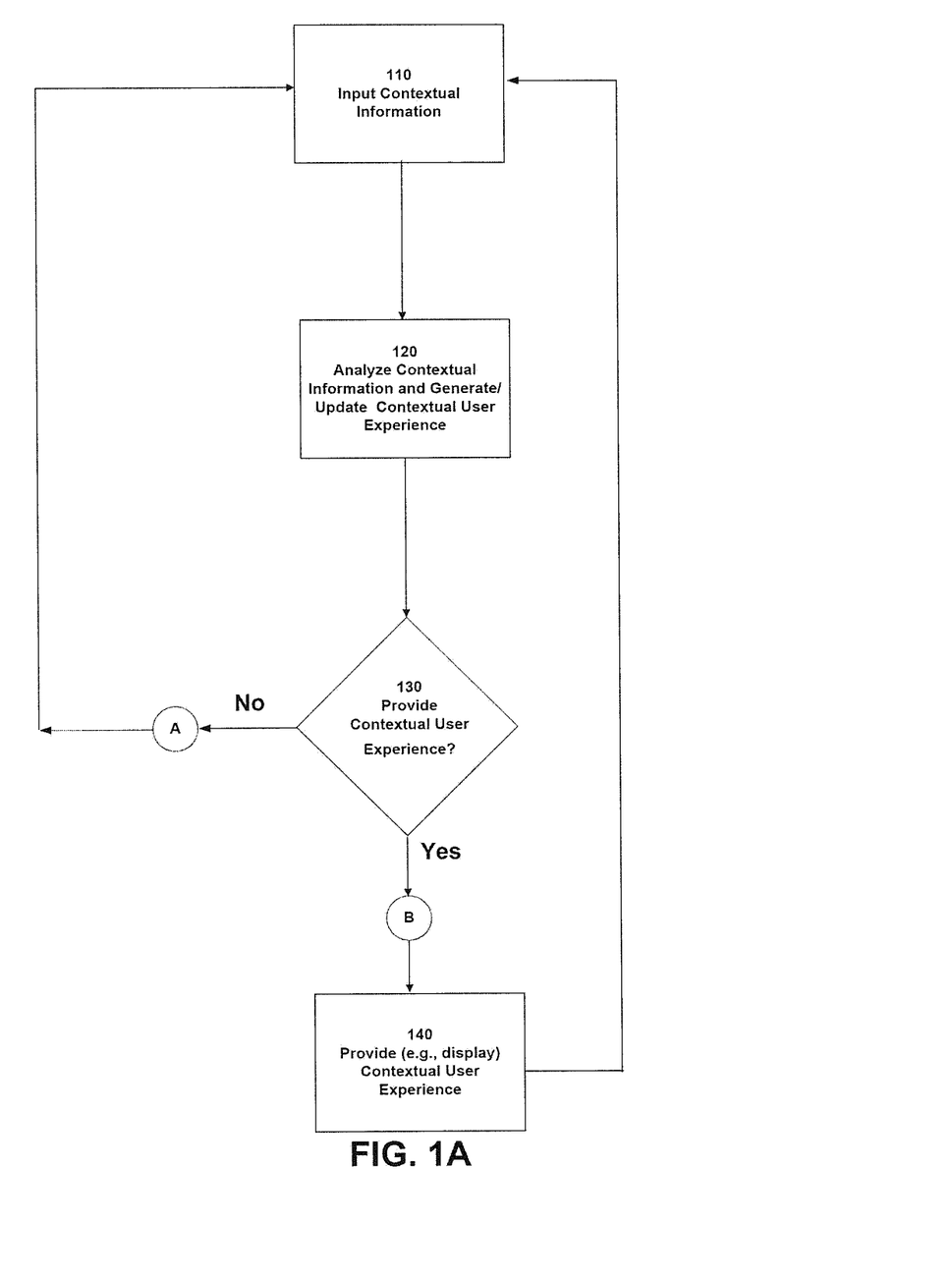
FIG. 1A shows a flow chart illustrating the steps for generating a contextual UX according to an example embodiment.

FIG. 1A shows a flow chart illustrating the steps for generating a contextual UX according to an example embodiment. In some embodiments, the contextual UX is a program on a user's computing device. The contextual UX receives an input of contextual information at step 110, analyzes the contextual information at step 120, and dynamically updates and/or generates the data displayed by the contextual UX at step 140.

Contextual information utilized in step 110 may be any data that can be input into the user's computing device and utilized by the contextual UX to dynamically update and/or generate the data displayed on the computing device. In some embodiments, the contextual information comprises an artifact. An artifact may represent digital information such as a file on the computing device, wherein the file may be a digital representation of, for example, an image, a photograph, a video clip, an audio clip, a weather report, a piece of text, a search query, or a snippet of application source code. It is to be understood by those skilled in the art that the aforementioned examples are not to be considered limiting, and that an artifact may be any quanta of data within the system of the contextual UX.

In other embodiments, an artifact may represent physical information about the user's environment such as in the physical space of the user. An artifact may be, for an example, an image, an object, sounds, or any other quanta of information that is representative of a user's environment. Artifacts existing in the physical environment of the user may be input to the contextual UX through any means of the computing device such as a camera, microphone, or other sensors. In one embodiment, the computing device's camera may be used to capture an object within view of the user, or the computing device's microphone may be used to receive a user voice command. Other aspects of a user's environment may be derived from the computing device's sensors that sense conditions of user's physical environment and provide the sensed conditions to the contextual UX through the computing device. Such sensors may include, for example, an ambient light sensor, a weather sensor such as a thermometer or a hygrometer, or location sensor such as a GPS.

Contextual information may also include information related to the user. This type of contextual information may be derived from the user's activities as they interact with the computing device on which the contextual UX is operating. For example, contextual information may be derived from the various applications installed on the computing device and utilized by the user during the course of a day. In some embodiments, the contextual UX may monitor the user's usage of a web browser such as collecting the user's search history. In some embodiments, the contextual UX may monitor the files accessed by the user on the computing device. Contextual information may be taken from a variety of sources including such things as the user's calendar and email (for example, Microsoft Exchange), the chat or instant messaging programs (for example, Microsoft Lync), SMS/MMS systems, the telephone, other messaging facilities, social media platforms, internal and/or external enterprise systems. The contextual information may be pulled, pushed, or received from these sources. In some embodiments, contextual UX may actively and continuously pull the contextual information by monitoring the user's activity with the installed applications. In some embodiments, contextual UX may passively receive the contextual information form the variety of sources. Application data may be obtained through any means, for example, APIs, interfaces, or protocols. In some embodiments, the contextual UX 100 may obtain the contextual information through means of interacting with a computing device, for example, a keyboard, a mouse, a touchpad, a touchscreen, any gestures captured by the computing device's camera, and a microphone.

At step 120, contextual UX analyzes the contextual information by determining relationships, or relevant correlations, between the contextual information. The purpose of the analysis performed by contextual UXX is to semantically understand the content of the inputted contextual information (from step 110) and how it relates to other user data. In some embodiments, the contextual UX may semantically understand the content of, for example, a user's email (a type of contextual information). In other embodiments, the contextual UX analyzes various information threads from various independent contextual information data sources to determine relationships between the information threads and joins determine the various information threads based on the determined relationships. As one example, the contextual UX may monitor a calendar and determine that an upcoming meeting is scheduled in the user's calendar, discussed during a phone call involving the user on the computing device, an email(s) from the user's email application, and/or an instant messaging chat involving the user on the computing device. After collecting this contextual information, the contextual UX joins these separate information threads together to form a profile of the user.

In some embodiments, contextual information may also include biometric data received from the computing device's sensors such as a camera, a fingerprint sensor, and/or a microphone. The biometric data may include a current image of the user during use of the computing device, the user's fingerprint, and/or the user's voiceprint from the computing device. The contextual UX may analyze the current image of the user to determine the user's emotional state, such as if the user is smiling or crying. The contextual UX may also use the camera to interpret the user's current facial expressions or measure the user's current pupil dilation. The contextual UX may collect the biometric data through other external sensors that are connectable to the computing device such as heart rate monitors, blood pressure sensors, and/or skin conductivity sensors. It is to be understood by those skilled in the art that the described examples are not to be limiting, but that a user's physical reaction to various emotions may be measured as understood in the art within the scope of the present disclosure.

In some embodiments, privacy settings may limit the type, scope, and/or nature of contextual information that is available to contextual UX. For example, a user may allow contextual UX to access their calendar and email system as sources for contextual information, but may not allow access to, for example, browser history. The user may also limit the manner in which contextual information is utilized by contextual UX.

Figure 1B:
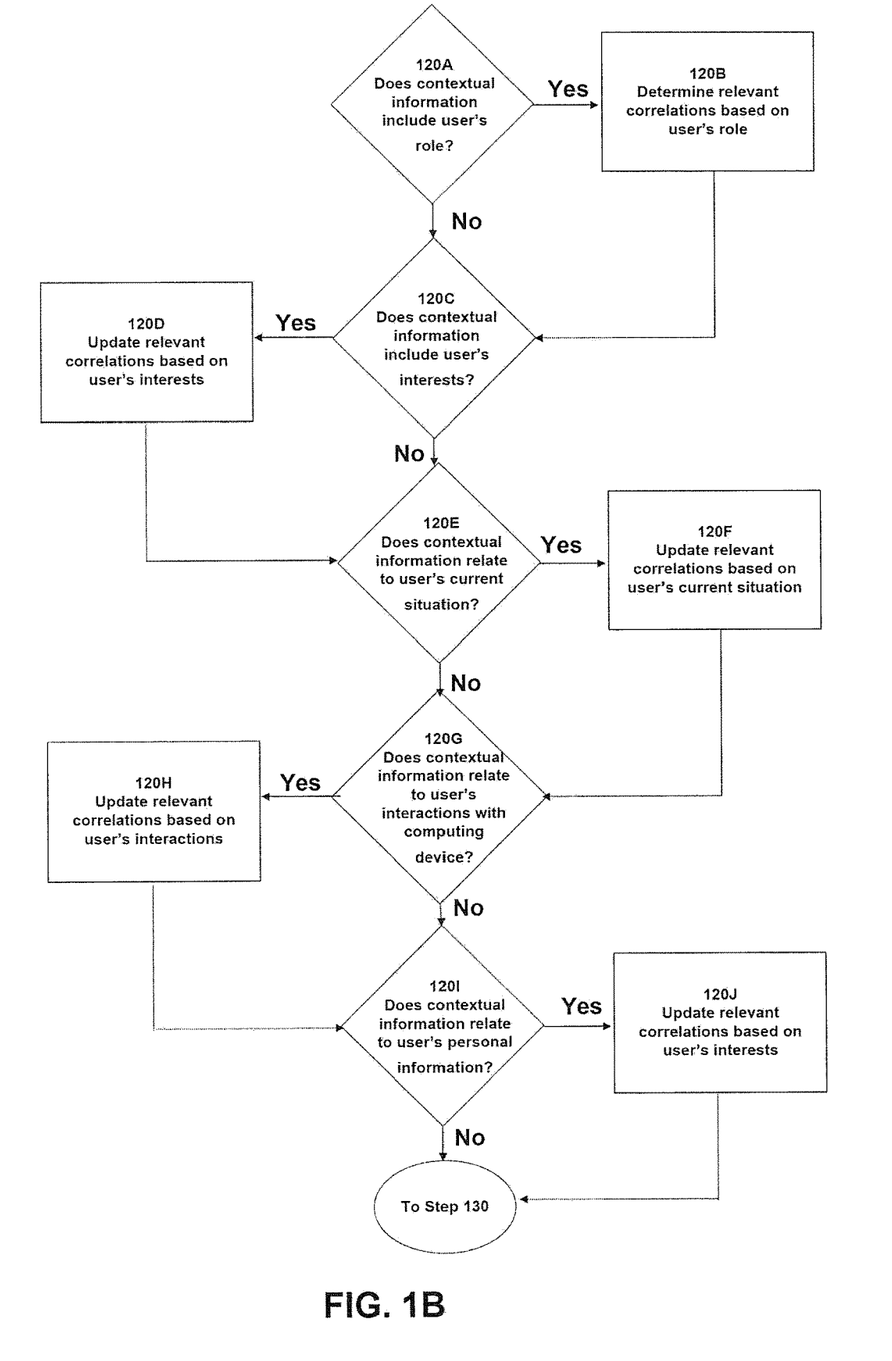
FIG. 1B shows a flow chart illustrating the steps for generating a contextual UX according to an example embodiment.

At step 120, contextual UX analyzes the contextual information to determine relevant correlations. FIG. 1B illustrates one example embodiment for this analysis step. Contextual UX may analyze the contextual information to derive knowledge about the user. In this embodiment, at step 120A, contextual UX may analyze the contextual information whether it includes information regarding a user's role. If so, at step 120B, contextual UX may determine relevant correlations based on the user's role. At step 120C, contextual UX may continue to analyze inputted contextual information by determining whether the contextual information includes the user's interests. If so, at step 120D, contextual UX may update the relevant correlations based on the user's interests. At step 120E, contextual UX may determine whether the contextual information has information relating to a user's current situation. As one example, this information may include the user's current physical surroundings or emotional state. If so, at step 120F, contextual UX may update the relevant correlations based on this information. At step 120G, contextual UX may determine whether the contextual information relates to the user's interactions with the computing device. For example, such interactions may include the user's interactions with previously displayed correlations or the user's interactions with applications installed on the computing device. If so, at step 120H, contextual UX may update the relevant correlations based on the user's interactions. At step 120I, contextual UX may determine whether the contextual information relates to a user's personal information. If so, at step 120J, contextual UX may update the relevant correlations based on the user's personal information. The process may then proceed to step 130 as described below with respect to FIG. 1A. In this manner, contextual UX refines the relevant correlations based on all available sources of contextual information for the user. Accordingly, the contextual UX learns about the user from the user's activities, behaviors, and reactions as the user interacts with the system. It is to be understood by those skilled in the art that the described embodiment is not limiting, and the determination of the relevant correlations may include additional or different steps, or the steps performed in a different order, or less or more steps in the determination of the relevant correlations.

In analyzing the contextual information, contextual UX may also determine relevant correlations that may be of interest to the user. Relevant correlations may be, for example, connections between disparate pieces of contextual information, artifacts related to those currently being interacted with by the user, or predicted actions to be completed by the user according to their present workflow. In some embodiments, relevant correlations, and the data supporting the relevant correlations, may be retrieved from any of the contextual information sources discussed above. In other embodiments, contextual UX 100 may retrieve information related to a relevant correlation and/or contextual information from an external data source as part of analysis step 120. This may be, for example, information on local weather or the stock market, retrieved from a data service or the internet. The relevant correlations are personalized. For example, the correlations may be derived according to a specific user's interests, current situation, skill level, or emotions.

In some embodiments, as described above with respect to FIG. 1A, analysis step 120 and contextual information input step 110 operate continuously and synchronously. That is, the user may be continuously generating contextual information to be used as input for the contextual UX as they, for example, interact with contextual UX through their day, and contextual UX may be continuously analyzing the newly-generated contextual information in a step 120 to derive a more complete understanding of the user, as well as provide more relevant correlations. This parallel input and analysis of contextual information may be supported by any number of different mechanisms, including, for example, workflow engines, rules, events, the rating/ranking of an event, alerts, prioritizations, one or more bodies of configuration information, algorithms, or logic. In some embodiments, the contextual UX may utilize machine learning techniques to refine its analysis of contextual information in order to better understand the user and provide more accurate relevant correlations and predictions.

Referring back to FIG. 1A, at step 130, a determination is made as to whether the correlations should be displayed as part of the contextual UX. If not, the contextual UX may repeat steps 110 and 120 and continue the inputting and analysis of contextual information until the next determination is to be made. If yes, contextual UX comprising the relevant correlations as determined at step 120 are displayed, for example, on the computing device of the user.

In some embodiments, contextual UX may only be generated and displayed when activated by the user. The user may trigger the generation and display of contextual UX by any typical means such as voice, texts, gestures, or through the use of entities, APIs, data, and/or applications. The user may then use similar means to terminate the display of contextual UX. In other embodiments, the contextual UX may be triggered automatically according to the analysis of contextual information. The contextual UX may also terminate automatically according to analysis of contextual information. In this way, the contextual UX may deliver relevant correlations to the user at the moment needed, and terminate when finished.

Figure 1C:
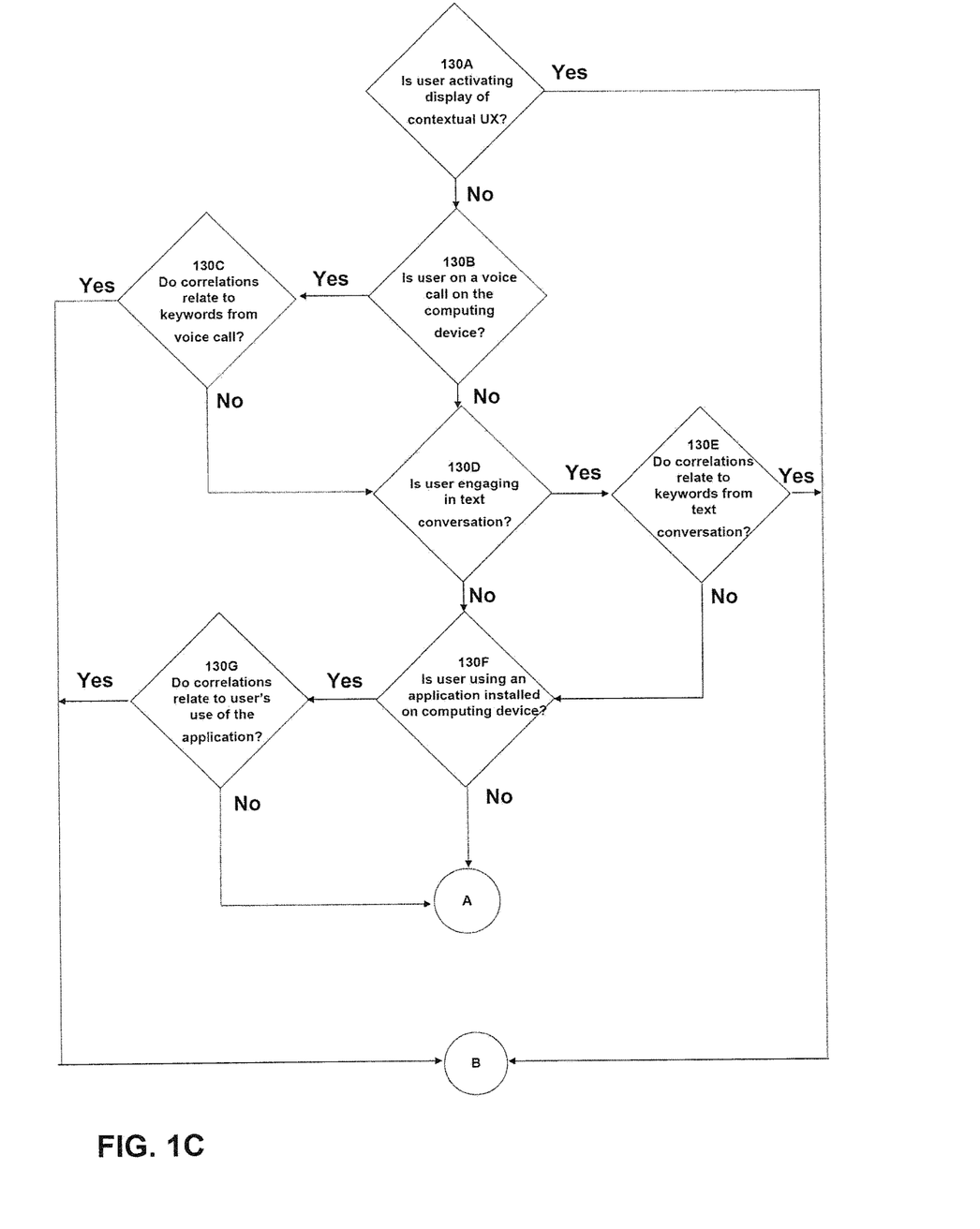
FIG. 1C shows a flow chart illustrating the steps for generating a contextual UX according to an example embodiment.

FIG. 1C illustrate one example embodiment for this displaying step. At step 130A, contextual UX determines whether the user is activating the display of the contextual UX. If yes, contextual UX proceeds to step 140 as described further below with respect to FIG. 1A. If not, contextual UX proceeds to determine whether another action, such as a user's interaction with the computing device, may trigger the display of the relevant correlations. For example, at step 130B, contextual UX determines whether the user is on a voice call on the computing device. Contextual UX may continuously monitor words spoken during the voice call. At step 130C, contextual UX may determine that certain words spoken during the call are keywords related to the relevant correlations determined in step 120. Accordingly, contextual UX may determine that display of the relevant correlations is appropriate. If the user is not engaged in a voice call or if no keywords are spoken during the call, the process may proceed to step 130D. At step 130D, contextual UX may determine whether the user is engaged in a text conversation, such as through SMS or a chat application. Contextual UX may continuously monitor words typed during the text conversation. At step 130E, contextual UX may determine that certain words typed during the call are keywords related to the relevant correlations determined in step 120. Accordingly, contextual UX may determine that display of the relevant correlations is appropriate. If the user is not engaged in a text conversation or if no keywords are typed during the conversation, the process may proceed to step 130F. At step 130F, contextual UX may determine whether the user is currently using an application installed on the computing device. If yes, for example, the user may be currently browsing webpages using a web browser installed on the computing device or taking a picture using a camera application. In these examples, contextual UX may utilize the user's search terms or visited webpages, or the image on the picture to determine any relation to relevant correlations, at step 130G. If the user is not using any application or if the relevant correlations are not related to the user's use of the applications, then contextual UX may determine that the relevant correlations should not be displayed at this time. In this manner, contextual UX may continuously determine when to display the relevant correlations based on a user's current or past actions on the computing device. It is to be understood by those skilled in the art that the described embodiment is not limiting, and the determination of the relevant correlations may include additional or different steps, or the steps performed in a different order, or less or more steps in the determination of the relevant correlations.

Referring back to FIG. 1A, at step 140, the contextual UX generates and displays contextual UX for the user. This may include, for example, displaying the determined relevant correlations to the user. In some embodiments, the relevant correlations may be displayed, placed, located, or positioned, within the contextual UX according to any number of criteria or constraints including for example importance or relevance. For example, the center of the contextual UX may be utilized for relevant correlations of high relevance or importance, while relevant correlations of low importance or relevance may be located along the periphery, with intervening regions providing varying gradations of relevance/importance. In other embodiments, relevant correlation's importance may be indicated through other visual means, such as color (for example, a red item is critically important), size (for example, more important items appear larger), transparency (for example, less important items have increased transparency), brightness (for example, less important items have reduced brightness), shape, or animation.

In some embodiments, the displayed aspects of contextual UX may be actionable, such as being selectable, being movable, and capable of being manipulated. such that the user may interact with the displayed aspects of the contextual UX. In some embodiments, the user may interact with the displayed aspects of contextual UX which may involve launching, activating, or triggering an application, function, process, or other action. For example, the user may select a displayed video file artifact, and contextual UX may then launch the appropriate application to view the video file. In some embodiments, contextual UX 100 may automatically launch, activate, or trigger an application, function, process, or other action. For example, contextual UX may analyze contextual information and determine that an upcoming meeting is being scheduled, and contextual UX may generate and save a calendar entry within the user's calendar. Contextual UX 100 may then display a confirmation of this calendar entry creation.

The interaction by the user with contextual UX may provide the contextual UX with additional contextual information to analyze, from which the contextual UX may determine additional relevant correlations to generate and display. That is, generation and display step 140, analysis step 120 and contextual information input step 110 may operate continuously and synchronously. In some embodiments, the displayed aspects of contextual UX may be continuously and dynamically adjusted as contextual UX incorporates additional contextual information or user action, and determines additional relevant correlations. In these embodiments, the process returns to step 110 and repeats steps 110, 120, 130, and 140 as described above.

Contextual UX may be generated and displayed on any device. In some embodiments, contextual UX may be displayed on, inter alia, a computer, laptop, smart cellular telephone, or tablet. In other embodiments, contextual UX may be generated and displayed by virtual reality or augmented reality devices and/or facilities. In the case of an augmented reality device, contextual UX may be generated and displayed on any suitable surface, such as a table, mirror, window or wall.

In some embodiments, contextual UX may generate and display one or more related contextual UXs for multiple users participating in a shared interaction. For example, contextual UX may generate and display distinct but related contextual UXs for each individual in a conversation. The contextual UX understands each user's specific domain and/or role, interests, current situation, skill level, or emotions, and may determine relevant correlations that may be the same or different from the other users participating in the shared interaction. In this way, contextual UX may generate and display complementary, yet personalized, UXs for each user.

Figure 2A:
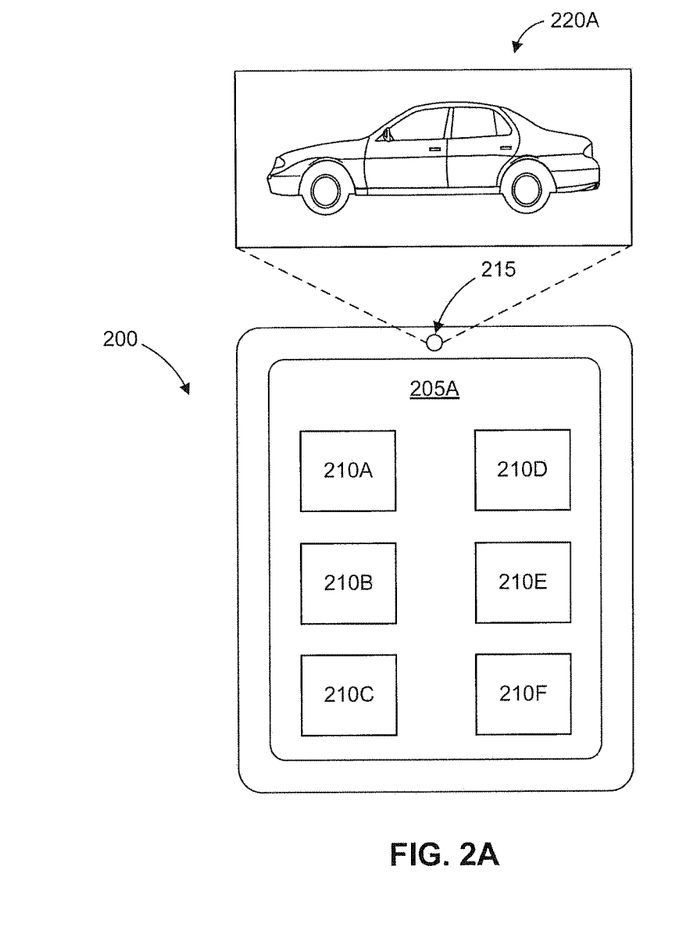
FIG. 2A illustrates a contextual UX according to an example embodiment.

FIG. 2A shows a contextual UX 205A on a computing device 200 according to an example embodiment. In an embodiment, a user may be at coffee shop while using an augmented reality device. The user may place an artifact, here an image of a vehicle 220A (although the disclosure is not limited to that example), near a camera 215 of the computing device. Alternatively, the user may take a picture of an actual vehicle 220A. Contextual UX 205A may then analyze the image of the vehicle 220A and determine relevant correlations from the contextual information and/or data sources to which contextual UX 205A has access. These relevant correlations 210A-210F are then displayed to the user as part of contextual UX 205A on computing device 200. For example, contextual UX 205A may determine that the user may be interested in upcoming promotions related to the vehicle 220A, as well as the interior, form design, engine performance characteristics, dimensions, and materials of the vehicle 220A.

The user may then select any of the relevant correlations 210A-210F, such as, the color of the vehicle 220A or engine performance characteristics of the vehicle 220A. Contextual UX 205A may then determine further relevant correlations based on the selected correlation. Contextual UX 205A may adjust the layout of the displayed relevant correlations accordingly, such as by placing unselected aspects in positions of less prominence, and display the newly-determined relevant correlations in a places of greater importance. For example, relevant correlations that are considered to be of higher priority may be placed at the center of the user's view.

In another exemplary situation, contextual UX 205A may automatically retrieve the initial image of the vehicle 2220A according to an analysis of contextual information such as biometric data. For example, camera 215 of computing device 200 may monitor a user's attention and determine that the user is observing vehicle 220A. Other sensors of computing device 200 or contextual information may also be involved in the determination of the contextual information. For example, computing device may monitor the user's heightened emotional response as measured by biometrics, such as an increase in heart rate or pupil dilation. Based on this contextual information, a contextual UX 205A may understand the user's interest in the car and may retrieve an image of the vehicle 220A, and display it, along with other relevant correlations 210A-210F, as discussed above.

Figure 2B:
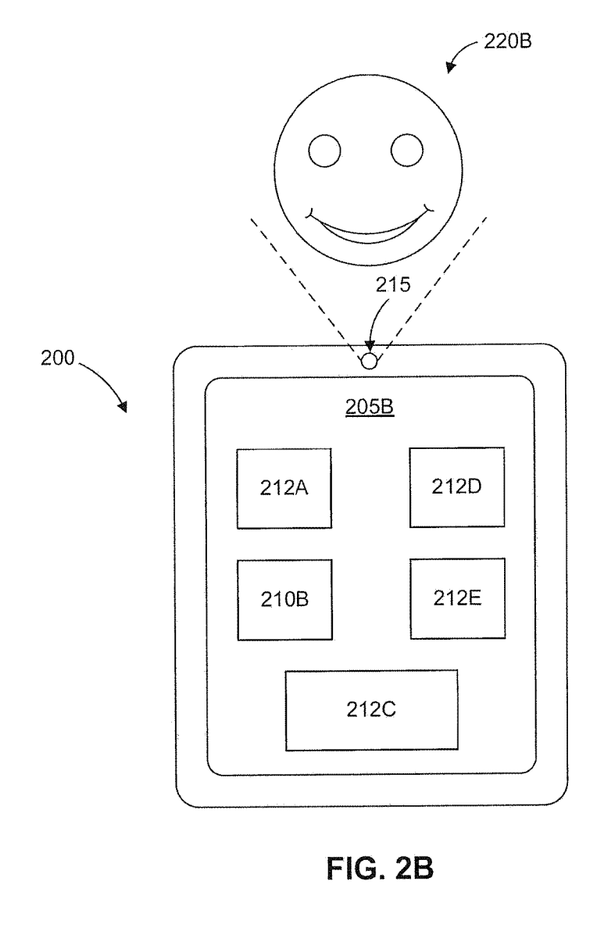
FIG. 2B illustrates a contextual UX according to an example embodiment.

FIG. 2B shows contextual UX 205B on computing device 200 according to an example embodiment. In this embodiment, computing device 200 may retrieve an artifact in the form of a biometric information related to a user of computing device 200. For example, camera 215 may determine that a user is smiling using a facial recognition application. Based on this contextual information, contextual UX 205B may determine relevant correlations 211A-211E based on the user's current mood using computing device 200.

Figure 2C:
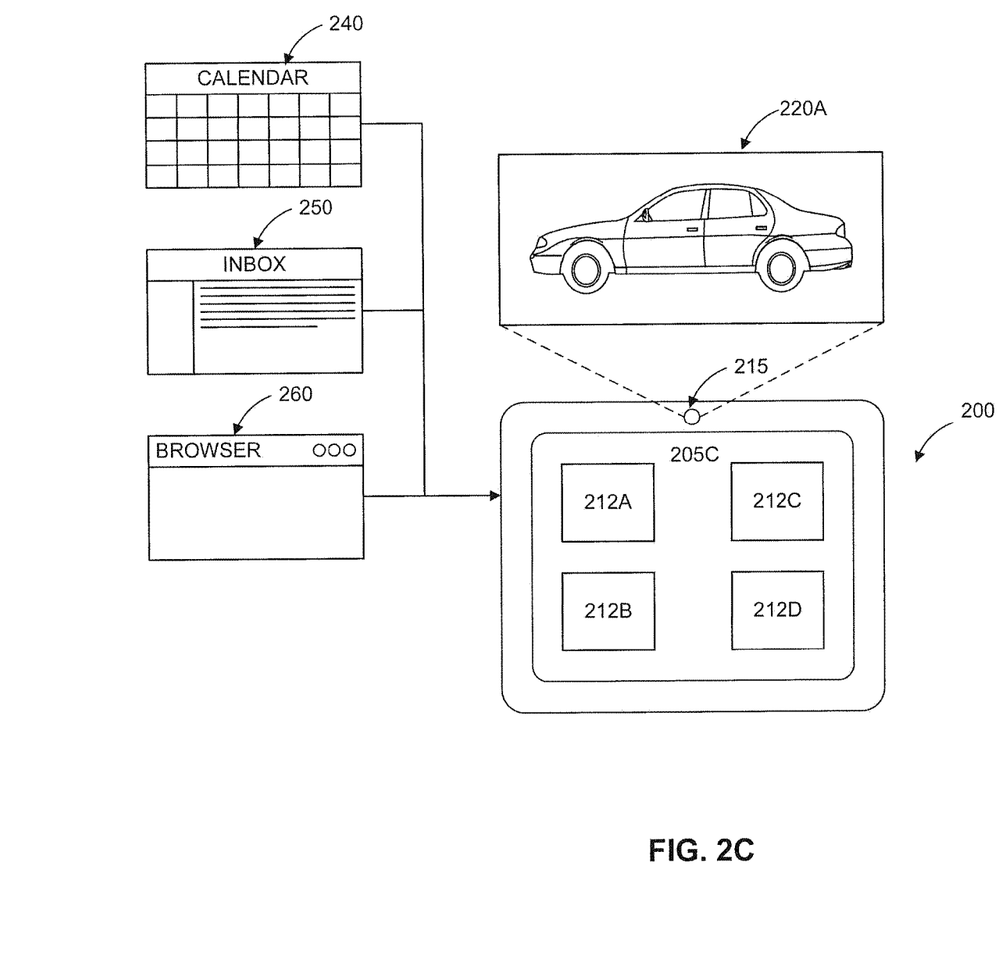
FIG. 2C illustrates a contextual UX according to an example embodiment.

FIG. 2C shows a contextual UX 205C on a computing device 200 according to an example embodiment. In this embodiment, contextual 205C may collect contextual information including an image of vehicle 220A from camera 215, information such as the user's appointments from the user's calendar 240, information, such as a user's emails, from user's mail application 250, and/or information, such as user's browser history, from a the user's browser 260. Calendar 250, mail application 250, and browser 260 may be installed on the user's computing device. Contextual UX 205C may then analyze the image of the vehicle 220A and determine relevant correlations 212A-212D from the additional contextual information and/or data sources to which contextual UX 205A has access as discussed above. These relevant correlations 212A. As discussed above, in determining the relevant correlations 212A-212D, contextual UX 205C may also collect additional data on the computing device 200, such as the user's emails, user's appointments, user's browser history and other types of data such as chat messages or voice data (such as voicemails). For example, contextual UX 205C may determine from the data that the user's favorite color is red, and will determine a relevant correlation 212C based on the user's favorite color.

Figure 3:
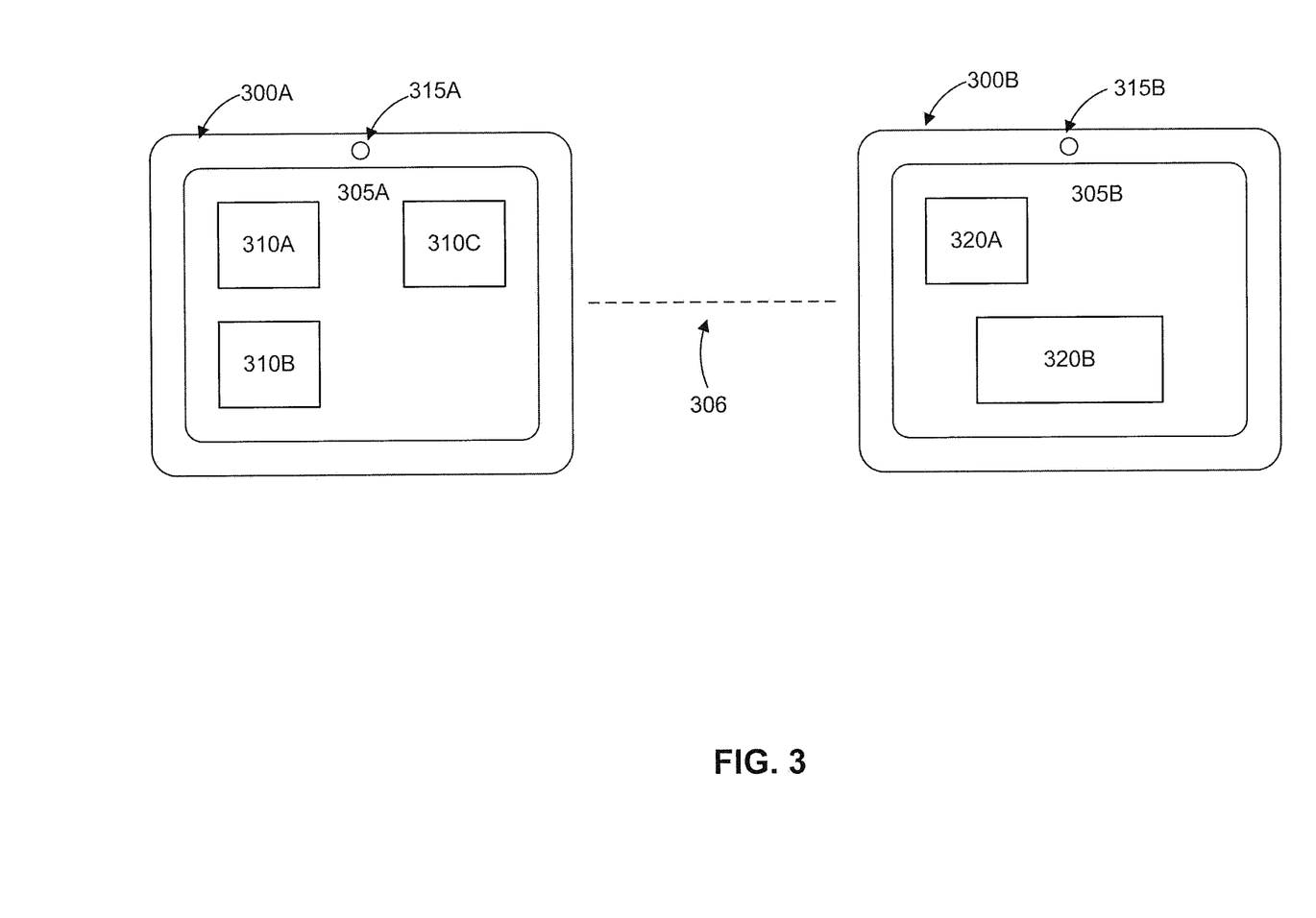
FIG. 3 show contextual UXs from the perspective of two parties to an interaction according to an example embodiment.

FIG. 3 illustrates contextual UXs 300A and 300B from the perspective of two parties participating in a shared interaction according to an example embodiment. In this exemplary situation, user A may be within a purchasing role and is using computing device 301, while user B may be within a sales role and is using computing device 302. User A may contact user B to discuss a required purchase using computing device 301 over connection 305 through an application installed on computing device 301. In some embodiments, user A may use an email application, a text message application, and/or a video conferencing application to contact user B over connection 305. In some embodiments, User A contacts user B for with sales question regarding, for instance, batteries for electric vehicles to be produced as part of a promotion being run by user A's business. As user A and user B communicate over connection 305, contextual UX 305A on computing device 301 and contextual UX 305B on computing device 302 may semantically understand contextual information obtained from the communication. Based on this contextual information, contextual UX 305A and 305B may determine relevant correlations. Contextual UXs for each respective user may then be displayed. For example, contextual UX 300A that may be generated and displayed for user A comprises correlations 310A-310C, while contextual UX 300B may be generated and displayed for user B and comprises correlations 320A and 320B. For example, information regarding the electric vehicle promotion may be displayed in correlation 310A for User A based on contextual UX 305a determining that it is user A's business running the promotion. However, correlations 320A and 320B may be based on contextual information specific to user B. For example, correlation 320A for user B may display the contact or biographic information for user A, the company for which user A works, and the types of batteries that user A may order. Each of contextual UXs 305A and 305B display relevant correlations for each user's specific context, such that the two UXs are related, because they are being generated as a result of a shared interaction, but personalized, because the two users occupy different roles.

Figure 4:
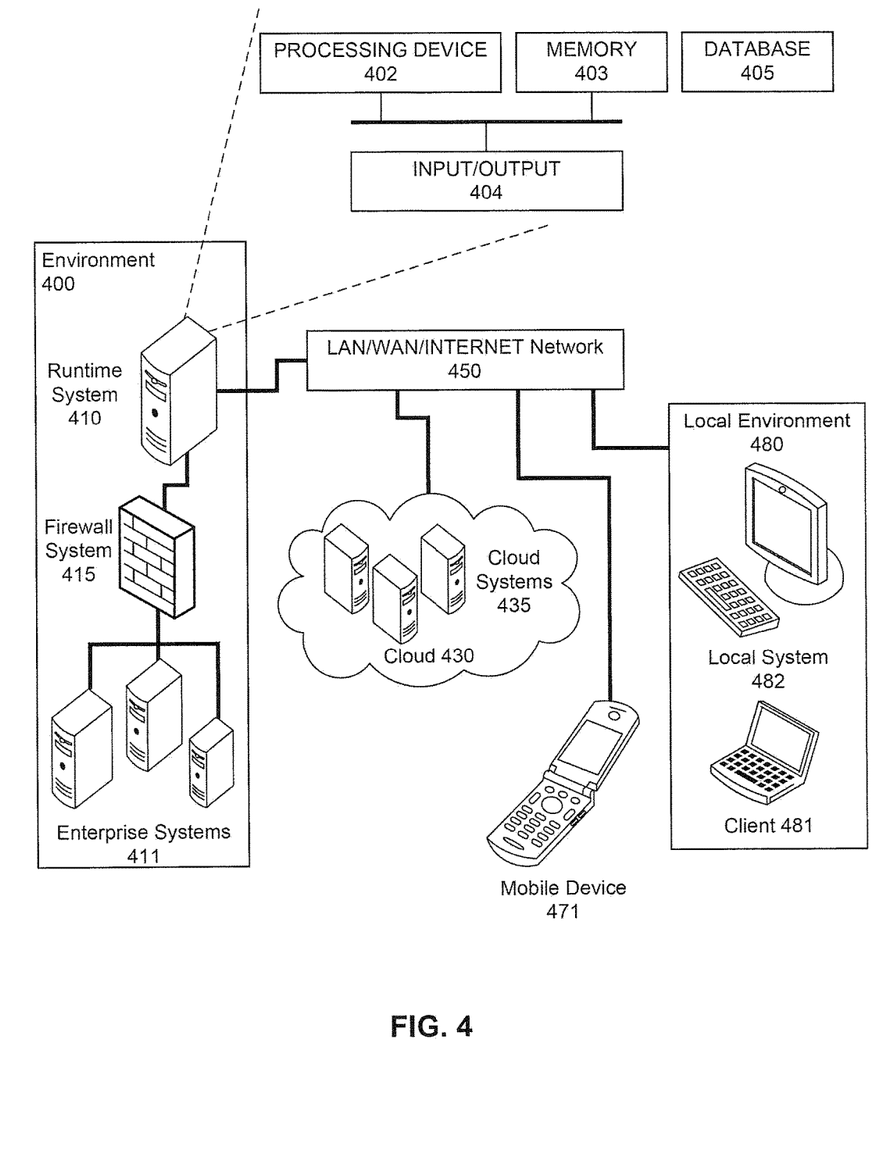
FIG. 4 shows an exemplary architecture of systems according to an example embodiment.

FIG. 4 shows an exemplary architecture of a computer system according to an example embodiment. Runtime system 410, may be connected to firewall system 415 and network 450. Network 450 may include a LAN, WAN, VPN, or the Internet. Mobile device 471, the local systems 482 and clients 481 in local environment 480, and the cloud systems 435 in the cloud environment 430 may also be connected to the network 450. The firewall system 415 may also be connected to the enterprise systems 411 and may provide an additional layer of security for enterprise systems 411 by preventing unauthorized access to these systems 411.

Each of the systems, clients, and devices in FIG. 4 may comprise any combination of one or more of a desktop computer, a notebook computer, a laptop computer, a tablet, a smartphone, a smartwatch, a virtual reality device, and an augmented reality device. In some embodiments, computing devices 200, 301, and 302 may be implemented as a notebook computer, a laptop computer, a tablet, a smartphone, a smartwatch, a virtual reality device, and an augmented reality device.

Each of the systems, clients, and devices in FIG. 4 may contain a processing device 402, memory 403 containing a database 405, and an input/output interface 404, all of which may be interconnected via a system bus. In various embodiments, each of the systems 411, 471, 410, 415, 430, 481, and 482 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 403 may contain different components for retrieving, presenting, changing, and saving data. Memory 403 may include a variety of memory devices, for example, Dynamic Random Access Memory (DRAM), Static RAM (SRAM), flash memory, cache memory, and other memory devices. Additionally, for example, memory 403 and processing device(s) 402 may be distributed across several different computers that collectively comprise a system.

Processing device 402 may perform computation and control functions of a system and comprises a suitable central processing unit (CPU). Processing device 402 may comprise a single integrated circuit, such as a microprocessing device, or may comprise any suitable number of integrated circuit devices and/or circuit boards working in cooperation to accomplish the functions of a processing device. Processing device 402 may execute computer programs, such as object-oriented computer programs, within memory 403.

Further, operation of the disclosed embodiments has been described in the context of servers and terminals that implement storage apparatus such as databases. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

The foregoing description has been presented for purposes of illustration and description. It is not exhaustive and does not limit embodiments of the disclosure to the precise forms disclosed. Modifications and variations are possible in light of the above teachings or may be acquired from the practicing embodiments consistent with the disclosure. For example, some of the described embodiments may include software and hardware, but some systems and methods consistent with the present disclosure may be implemented in software or hardware alone. Additionally, although aspects of the present disclosure are described as being stored in memory, this may include other computer readable media, such as secondary storage devices, for example, hard disks, floppy disks, or CD ROM; the Internet or other propagation medium; or other forms of RAM or ROM.

The disclosure is also directed to computer program products comprising software stored on any computer useable medium. Such software, when executed in one or more data processing devices, causes data processing device(s) to operate as described herein. Embodiments of the disclosure employ any computer useable or readable medium, known now or in the future. Examples of computer useable mediums include, but are not limited to, primary storage devices (for example, any type of random access memory), secondary storage devices (for example, hard drives, floppy disks, Compact Disc Read-Only Memory (CD-ROM) disks, Zip disks, tapes, magnetic storage devices, optical storage devices, Microelectromechanical Systems (MEMS), or nanotechnological storage device.), and communication mediums (for example, wired and wireless communications networks, local area networks, wide area networks, or intranets.).

Based on the teachings contained in this disclosure, it will be apparent to persons skilled in the relevant art(s) how to make and use the disclosure using data processing devices, computer systems, and/or computer architectures other than that shown in FIG. 4. In particular, embodiments may operate with software, hardware, and/or operating system implementations other than those described herein.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those skilled in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive. In addition, in the foregoing Detailed Description, various features may be grouped or described together for the purpose of streamlining the disclosure. This disclosure is not to be interpreted as reflecting an intention that all such features are required to provide an operable embodiment.

What is claimed is:

1. A computer-implemented method, comprising:
    collecting contextual information regarding an interaction between a first computing device associated with a first user and a second computing device associated with a second user;
    determining a first correlation between the contextual information and information associated with the first user and a second correlation between the contextual information and information associated with the second user, wherein the first correlation is different from the second correlation;
    generating a first contextual user experience based on the first correlation, wherein the first contextual information includes at least one of biometric data of the first user, physical information of an environment of the first user, and a workflow of the first user with the first computing device;
    generating a second contextual user experience based on the second correlation;
    transmitting the first contextual user experience to the first computing device and the second contextual user experience to the second computing device, wherein the first contextual user experience is different from the second contextual user experience; and
    continuously collecting the contextual information regarding usage of the first computing device by the first user and continuously analyzing the contextual information until receiving an indication to display the first contextual user experience.

2. The computer-implemented method of claim 1, wherein the physical information from the first user's environment is obtained by a sensor of the first computing device.

3. The computer-implemented method of claim 2, wherein the sensor includes at least one of a camera, a fingerprint sensor, or a microphone.

4. The computer-implemented method of claim 1, wherein the biometric data includes an image of the first user.

5. The computer-implemented method of claim 1, wherein the first user's workflow includes the first user's interactions with at least one of a calendar application, email application, or web browser installed on the first computing device.

6. The computer-implemented method of claim 1, further comprising:
    monitoring a plurality of contextual information sources, wherein collecting the contextual information regarding usage of the first computing device by the first user includes retrieving the contextual information from the plurality of contextual information sources.

7. The computer-implemented method of claim 6, wherein the plurality of contextual information sources includes at least one application installed on the first computing device, a sensor of the first computing device, and a first user's interactions with the first contextual user experience.

8. The computer-implemented method of claim 1, wherein the contextual information includes at least two of biometric data of the first user, physical information of an environment of the user, and a workflow of the user with the computing device.

9. The computer-implemented method of claim 1, further comprising receiving, by the computing device, an indication to display the first contextual experience on a display of the first computing device, wherein the indication includes at least one of a manual indication from the first user or an automatic indication.

10. A computer-program product comprising a non-transitory computer readable medium, the computer program product including code to implement a method comprising:
    Collecting contextual information regarding a text-based interaction between a first computing device associated with a first user and a second computing device associated with a second user, wherein the first user is associated with a first role and the second user is associated with a second role;
    determining a first correlation between the contextual information and information associated with the first user and a second correlation between the contextual information and information associated with the second user, wherein the first correlation is different from the second correlation;
    generating a first contextual user experience based on the first correlation and based on the first role, wherein the contextual information includes at least one of biometric data of the first user, physical information of an environment of the first user, and a workflow of the first user with the first computing device;
    generating a second contextual user experience based on the second correlation and on the second role;
    transmitting the first contextual user experience to the first computing device and the second contextual user experience to the second computing device, wherein the first contextual user experience is different from the second contextual user experience; and continuously collecting the contextual information regarding usage of the first computing device by the first user and continuously analyzing the contextual information until receiving an indication to display the first contextual user experience.

11. The computer-program product of claim 10, wherein the method further comprises monitoring a plurality of contextual information sources, wherein collecting the contextual information regarding usage of the first computing device by the first user includes retrieving the contextual information from the plurality of contextual information sources.

12. The computer program product of claim 10, wherein the contextual information includes at least two of biometric data of the first user, physical information of an environment of the first user, and a workflow of the first user with the computing device.

13. A system comprising:
a processor coupled to memory, the processing being programmed to: collect contextual information regarding an interaction between a first computing device associated with a first user and a second computing device associated with a second user;
determine a first correlation between the contextual information and information associated with the first user and a second correlation between the contextual information and information associated with the second user, wherein the first correlation is different from the second correlation;
generate a first contextual user experience based on the first correlation and based on information from the second user, wherein the contextual information includes at least one of biometric data of the first user, physical information of an environment of the first user, and a workflow of the first user with the computing device;
generate a second contextual user experience based on the second correlation and based on information from the first user; and
transmit the first contextual user experience to the first computing device and the second contextual user experience to the second computing device, wherein the first contextual user experience is different from the second contextual user experience.

14. The system of claim 13, wherein the processor is further programmed to monitor a plurality of contextual information sources, wherein collecting the contextual information regarding usage of the first computing device by the first user includes retrieving the contextual information from the plurality of contextual information sources.

15. The system of claim 13, wherein the contextual information includes at least two of biometric data of the first user, physical information of an environment of the first user, and a workflow of the first user with the first computing device.

* * * * *